W. W. PECK & H. H. KNIGHT.
Washer and Nut.
No. 224,472.  Patented Feb. 10, 1880.
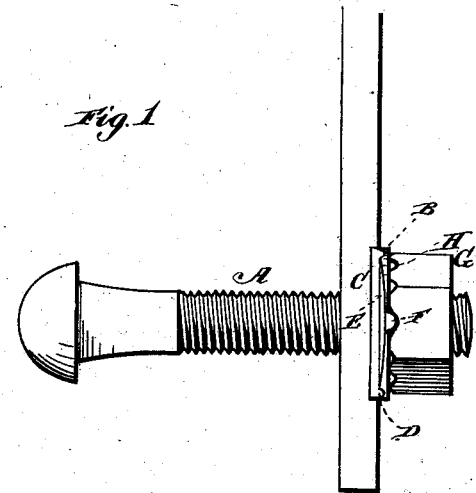
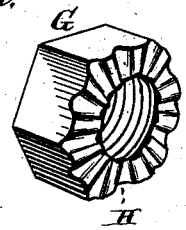
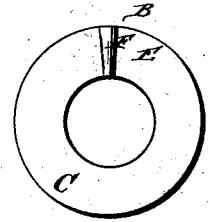
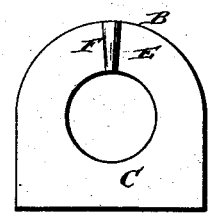
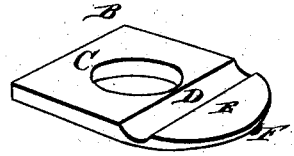
WITNESSES
Robert Ewalt
Chas. G. Page
INVENTORS
Henry H. Knight and
William W. Peck.
Gilmore, Smith & Co.,  ATTORNEYS

UNITED STATES PATENT OFFICE.

WILLIAM W. PECK, OF NEWARK, AND HENRY H. KNIGHT, OF SANDUSKY, OHIO.

WASHER AND NUT.

SPECIFICATION forming part of Letters Patent No. 224,472, dated February 10, 1880.

Application filed December 6, 1879.

*To all whom it may concern:*

Be it known that we, WILLIAM W. PECK, of Newark, Licking county, Ohio, and HENRY H. KNIGHT, of Sandusky, in the county of Erie and State of Ohio, have invented certain new and useful Improvements in Washers and Nuts; and we do hereby declare that the following is a full, clear, and exact description of the construction and operation of the same, reference being had to the annexed drawings, making a part of this specification, and to the letters and figures of reference marked thereon.

Figure 1 of the drawings is a representation of my nut-lock as applied. Fig. 2 is a perspective view of the nut; and Figs. 3, 4, 5, and 6 are detail views.

Our present invention relates to a nut-lock in which the washer, which is adjusted upon the screw-bolt intermediate of the nut and fish-plate, has a portion of its area reduced in thickness and a groove formed between its body and the said reduced part, so as to give to the latter portion of the washer sufficient resiliency to cause a rib upon its outer face to spring into a series of radial grooves in the nut when the same is screwed down upon the washer, all as hereinafter more fully described, and particularly pointed out in the claim.

Referring by letter to the drawings, A designates the screw-bolt, which is passed through the fish-plates, rail, and washer. The washer B, which fits against the fish-plate, is prevented from turning upon the bolt by reason of a flange upon the fish-plate, or by other ordinary or equivalent means. A portion of the washer is reduced in thickness from its under side, and a groove or channel, D, formed between the same and the unreduced portion of the washer, so that in effect the washer comprises a main and rigid body, C, with a spring-plate, E, integral therewith. The main body or rigid portion of the washer is formed with the opening for the screw-bolt, and is preferably square-shaped at its corners, so as to adapt it to fit against the usual flange of the rail.

The flexible portion E of the washer may, however, be made circular in outline, and this part is formed with a rib, F, upon its outer face, or that side which comes next to the nut G. This rib is formed in a line radiating from the center of the opening in the washer, and upon the under side of the nut we form a series of radial grooves, H, into which the rib will fit when the parts are properly adjusted in position. The rib F increases in prominence from the opening H to the rim of the flexible part of the washer, and this part of the washer decreases in thickness from the groove to its said rim, as herein illustrated.

The above form of the rib insures its engagement in the series of grooves in the nut when the spring portion of the washer is bent down by tightening up the nut upon the bolt, and the taper or bevel of the said thinner and spring portion of the washer increases its resiliency.

In securing the parts together the bolt is passed through the fish-plates and rail, and the washer adjusted upon the bolt so as to fit against one of the fish-plates and rest one edge against the flange of the rail. The nut or burr is then turned down upon the bolt and against the washer, the spring portion of which will be depressed by the pressure upon its rib until the nut fits closely against the face of the washer and the rib springs into one of the radial grooves, thereby effectually preventing the nut from turning and becoming loose upon its bolt. The resiliency of the thinner part of the washer admits of the ribs between the channels of the nut riding over the rib of said part of the washer until the nut and the washer are in close contact with each other.

When the above nut and washer are employed in connection with bolts used in iron bridges, trucks, and the like, having plain surfaces upon which the washer rests, the washer may be made with projections I upon one side, which extend into corresponding recesses, thereby preventing the washer from turning and subserving the same purpose as the flange upon a fish-bar.

A notched ratchet-nut has been used in connection with a spring-washer before; and we do not broadly claim the combination of the two.

What we claim, and desire to secure by Letters Patent, is—

In a nut-lock, the washer comprising a rigid body, C, and a thinner spring portion, E, with a channel intermediate of the said two parts, the spring portion E being beveled from the channel to its rim, and having a rib, F, upon its outer face, in combination with the screw-bolt and its nut formed with a series of radial grooves, substantially as herein shown and set forth.

In testimony that we claim the above we have hereunto subscribed our names in the presence of two witnesses.

WM. W. PECK.
HENRY H. KNIGHT.

Witnesses:
C. C. BITTNER,
T. L. McEWEN.